United States Patent
McGee et al.

(10) Patent No.: US 9,126,854 B2
(45) Date of Patent: Sep. 8, 2015

(54) APPARATUS FOR TARGET COMPOUND TREATMENT

(75) Inventors: Todd McGee, Anthem, AZ (US); Mark Macdonell, Sugarland, TX (US); David Scott Kosch, Coconut Grove, FL (US); Tommy Stern, Lantana, TX (US)

(73) Assignee: Clear River Enviro, LLC, Flour Mound, TX (US)

( * ) Notice: Subject to any disclaimer, the term of this patent is extended or adjusted under 35 U.S.C. 154(b) by 808 days.

(21) Appl. No.: 12/807,551

(22) Filed: Sep. 7, 2010

(65) Prior Publication Data
US 2011/0064624 A1 Mar. 17, 2011

Related U.S. Application Data

(63) Continuation-in-part of application No. 12/631,446, filed on Dec. 4, 2009, now abandoned, which is a continuation-in-part of application No. 12/378,060, filed on Feb. 11, 2009, now abandoned.

(51) Int. Cl.
C02F 1/72 (2006.01)
C02F 1/28 (2006.01)
(Continued)

(52) U.S. Cl.
CPC .............. *C02F 1/72* (2013.01); *F23J 15/003* (2013.01); *F23J 15/025* (2013.01); *C02F 1/283* (2013.01);
(Continued)

(58) Field of Classification Search
CPC .............. C02F 1/283; C02F 1/32; C02F 1/42; C02F 1/4695; C02F 1/72; C02F 1/722; C02F 9/00; C02F 9/005; C02F 2103/003; C02F 2103/343; C02F 2201/007; C02F 2209/001; C02F 2209/003; C02F 2209/40; F23J 15/025; F23J 15/003

USPC ......... 210/675, 694, 192, 201, 202, 205, 206, 210/232, 241, 260, 261, 262, 282, 85, 283, 210/287, 290; 588/318, 320
See application file for complete search history.

(56) References Cited

U.S. PATENT DOCUMENTS 3,327,855 A * 6/1967 Watson et al. ................ 210/108
(Continued)

OTHER PUBLICATIONS

Donn et al., "AP: Drugs found in Drinking Water," USA Today article Mar. 20, 2008, 7 pages.
(Continued)

*Primary Examiner* — Lucas Stelling
(74) *Attorney, Agent, or Firm* — Foley & Lardner LLP

(57) ABSTRACT

An apparatus adapted to treat at least one target compound comprising a housing through which fluid may pass; a receiving zone defined within the housing; disposed after the receiving zone within the housing, a destruction zone in which an aqueous solution containing at least one target compound is exposed to a destruction agent, the destruction agent adapted to convert the target compound into destruction byproducts; disposed after the destruction zone, a filtration zone containing a filtration agent adapted to remove the destruction byproducts from the solution; liquid disposal means for receiving solution from the filtration zone; and solid disposal means for receiving solids from the filtration zone, whereby, the target compound is first converted to byproducts, then the byproducts are filtered out of the solution, preventing target compounds from entering wastewater systems and ultimately re-entering the water supply. Physical embodiments of the invention include an in-line version for mounting under a sink; a version mounted near a sink and in communication with plumbing, but not in-line; a version that is transportable within a cart; and a toilet-mounted version for removing target compound from urine. Docking stations may be provided for collection of target compounds, which stations then releasably communicate with the apparatus to transfer collected target compounds from the station to the apparatus. Various agents and processes are disclosed for destroying target compounds and for filtering byproducts.

17 Claims, 7 Drawing Sheets

(51) Int. Cl.
*C02F 1/42* (2006.01)
*C02F 1/32* (2006.01)
*C02F 1/46* (2006.01)
*F23J 15/00* (2006.01)
*F23J 15/02* (2006.01)
*C02F 1/469* (2006.01)
*C02F 103/34* (2006.01)

(52) U.S. Cl.
CPC ... *C02F 1/32* (2013.01); *C02F 1/42* (2013.01); *C02F 1/4695* (2013.01); *C02F 1/722* (2013.01); *C02F 2103/343* (2013.01); *C02F 2305/026* (2013.01)

(56) References Cited

U.S. PATENT DOCUMENTS

| | | | |
|---|---|---|---|
| 4,263,934 A | 4/1981 | Redden et al. | |
| 4,311,594 A | 1/1982 | Perry | |
| 5,174,879 A * | 12/1992 | Gadke-Fuhrmann | 204/265 |
| 5,374,394 A | 12/1994 | Kralovic | |
| 5,464,766 A | 11/1995 | Bruno | |
| 5,681,459 A | 10/1997 | Bowman | |
| 5,725,762 A * | 3/1998 | Beal et al. | 210/181 |
| 5,776,260 A | 7/1998 | Dunn et al. | |
| 5,856,173 A | 1/1999 | Riley et al. | |
| 5,928,506 A * | 7/1999 | Bae | 210/94 |
| 6,161,228 A | 12/2000 | Wietecha | |
| 6,263,887 B1 | 7/2001 | Dunn | |
| 6,383,382 B1 * | 5/2002 | Johll et al. | 210/282 |
| 6,402,932 B1 * | 6/2002 | Bremer et al. | 205/701 |
| 6,637,587 B2 | 10/2003 | Britton | |
| 6,861,002 B2 | 3/2005 | Hughes | |
| 6,863,827 B2 * | 3/2005 | Saraceno | 210/241 |
| 6,868,344 B1 | 3/2005 | Nelson | |
| 7,090,179 B2 | 8/2006 | DiMaggio | |
| 2002/0179508 A1 * | 12/2002 | Nachtman et al. | 210/192 |
| 2003/0115665 A1 | 6/2003 | Braxton | |
| 2005/0258082 A1 * | 11/2005 | Lund et al. | 210/101 |
| 2006/0191065 A1 | 8/2006 | Martinez et al. | |
| 2006/0265241 A1 | 11/2006 | Mallett et al. | |
| 2007/0027432 A1 | 2/2007 | Radford et al. | |
| 2009/0283409 A1 | 11/2009 | Stern et al. | |

OTHER PUBLICATIONS

EPA Report EPA-821-R-08-013: Health Services Industry Study, Management and Disposal of Unused Pharmaceuticals (Interim Technical Report) Aug. 2008, 87 pages.
International Search Report and Written Opinion on PCT/US11/50706, mailed Jan. 23, 2012.
Web Page for Eco Rex product, printed from the internet on Dec. 2, 2008, 3 pages.
Handout for Pharmaceutical Waste Management Workshop, Oct. 8, 2008, 67 pages.
Press release Emerging Medical Company Targets $1B Market in Pharmaceutical Waste Management with New Technology, Jun. 22, 2005, 2 pages.

* cited by examiner

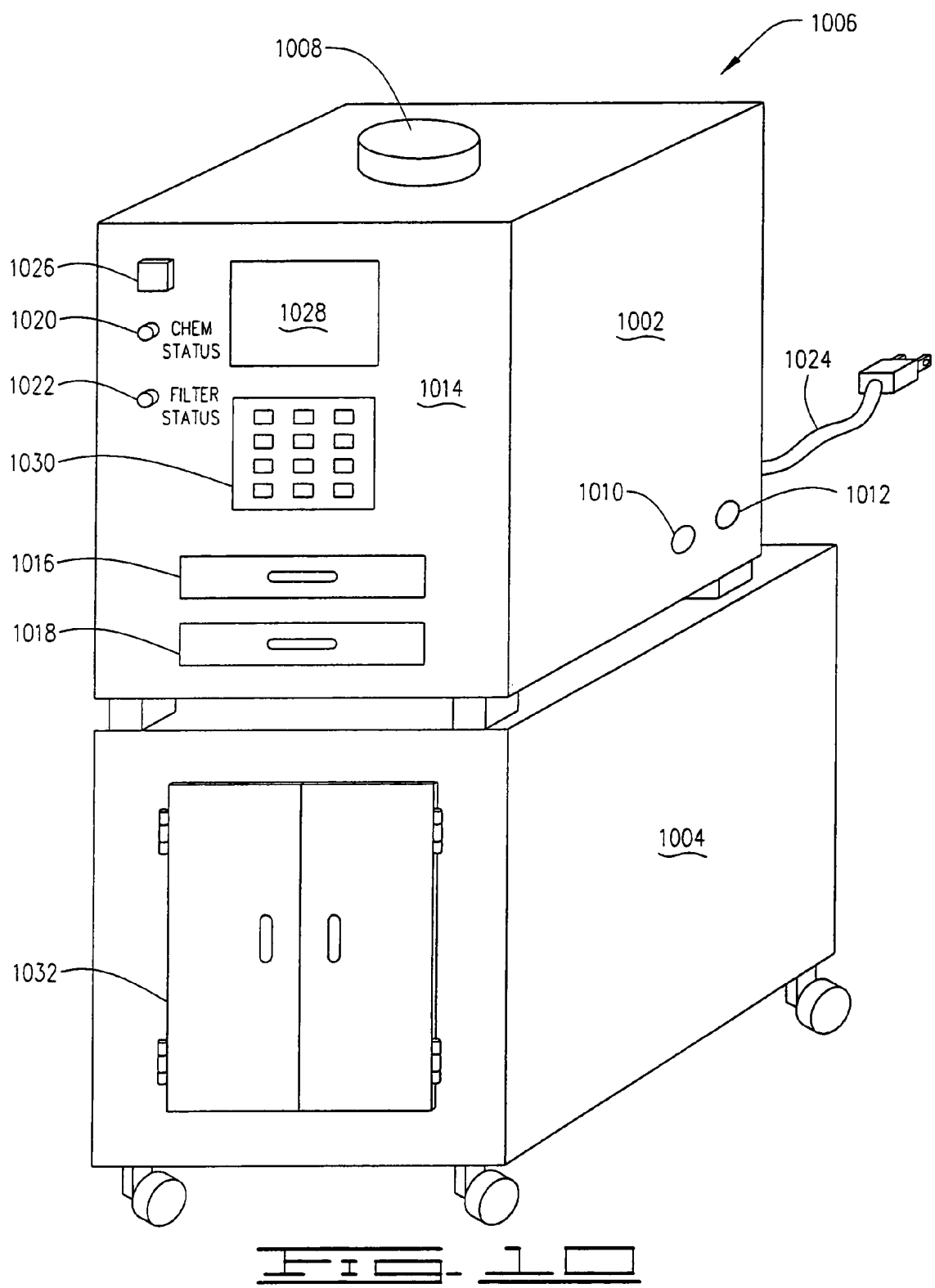

APPARATUS FOR TARGET COMPOUND TREATMENT

CROSS REFERENCES TO RELATED APPLICATIONS

This application is a continuation-in-part of U.S. application Ser. No. 12/631,446 filed on Dec. 4, 2009, which is a continuation-in-part of U.S. application Ser. No. 12/378,060 filed on Feb. 11, 2009.

BACKGROUND OF THE INVENTION

There is a need for a convenient way to dispose of compounds such as drugs, injectables, and other pharmaceutical compounds in a way such that they do not contaminate waterways and/or eventually return unused and unprocessed pharmaceuticals to the public water supply. Wastewater contamination is an important issue, especially in hospital, dental, home care and other settings where pharmaceuticals are commonly discarded. Healthcare workers are known to dispose of pharmaceuticals incorrectly, often unintentionally, which can lead to contaminated waste water. In the hospital, dental, home care and other settings, items that contain toxic chemicals are routinely poured down sinks. Since most waste water treatment facilities do not specifically treat for these chemicals, this can lead to pollution problem and to drugs making their way into public water supplies. In some instances, disposal of chemicals down sinks may lead to fines for violating EPA regulations.

The EPA has identified 1,500 publicly owned treatment works ("POTWs") that are required to have a pretreatment program, and another 13,500 facilities that are not required to have a pretreatment program. Given the breadth of potential contaminants, the EPA focused on the following waste materials: mercury, primarily from dental facilities, but also from some medical equipment devices; and unused pharmaceuticals. Unused pharmaceuticals include animal and human drugs. Recent estimates are that over 200 million pounds of unused pharmaceuticals are dumped into the nation's wastewater system. They include wasted pills, excess liquid formulations (injectables and swallowed) and spilled biohazards. While the EPA and other regulators have best management practices in place, there is no measured data on the amount of unused pharmaceuticals entering POTWs. Current best management practices include: incineration or disposal in a solid-waste landfill. However, most pharmaceuticals are still disposed by being poured down a sink.

In its August 2008 *Health Services Industry Study*, ("EPA 2008 Study") EPA stated that, "52,089 hospitals and [other medical facilities] are potentially discharging spent pharmaceuticals" into the US water system, and "most of the facilities that discharge wastewater must discharge it indirectly to municipal sewer systems." The EPA 2008 Study is incorporated herein by reference. The report goes on to say that "a number of studies conducted over the past 10 years suggest detection of pharmaceutical compounds in treated wastewater effluent, streams, lakes, seawater, and groundwater, as well as in sediments and fish tissue." The EPA is being pushed to solve this growing problem.

The EPA 2008 Study notes at p.4-1 and following that The Drug Enforcement Agency ("DEA") enforces the Controlled Substances Act ("CSA"). The goal of the CSA is to provide a closed distribution system for controlled substances. As part of this closed distribution system, DEA prohibits the return of controlled substances from end-users to any DEA registrant (including pharmacies, hospitals, clinics, researcher, or practically any other facility or individual), or transfer to anyone except, in certain cases, a law-enforcement agent. Disposal of controlled substances by DEA registrants is carefully regulated to ensure that the substance is destroyed or rendered unrecoverable. One acceptable method of destruction is flushing controlled substances into the wastewater. DEA registrants have the following options for disposing of controlled substances:

They can return the controlled substance to the pharmaceutical manufacturer.

They can transfer the controlled substances to a reverse distributor to return them to the manufacturer or dispose of them. Hospitals typically have pre-existing arrangements with hazardous waste disposal firms and therefore do not need to make special arrangements for disposal of unused pharmaceuticals as hazardous waste. These disposal firms pick up the materials from the hospital and handle proper disposal.

They can dispose of the controlled substances under the procedures outlined in 21 CFR 1307.21, which provides that a DEA Special Agent in Charge can authorize for the disposal of the controlled substance in several ways.

In the EPA 2008 Study at p.6-1, EPA asserts that health service facilities have three disposal options for pharmaceuticals that are identified as waste and which cannot be returned to manufacturer for credit: (1) disposal to sewer; (2) incineration (RCRA incineration or low temperature incineration); and (3) disposal to landfill. These disposal mechanisms, however, follow the option of returning materials to the manufacture to be recycled/recovered for reuse.

Common pharmaceuticals that are considered "hazardous wastes" under the Resource Conservation and Recovery Act ("RCRA") include epinephrine, nitroglycerin, warfarin, nicotine, and many chemotherapy agents. These waste items are subject to unique and expensive disposal requirements, since the EPA regulates the generation, storage, transportation, treatment, and disposal of any pharmaceutical waste defined as hazardous waste by RCRA. The EPA is considering an expansion of these regulations by adding hazardous pharmaceutical waste to the Universal Waste Rule and published its intent in the Federal Register on Dec. 2, 2008. Hospitals and other health care providers in several states have faced significant fines associated with violations of RCRA and EPA requirements. Fine amounts can be large and vary by state. Facilities in Nebraska, Minnesota, Florida, and other states have already been subject to inspections and subsequent fines, sometimes in excess of $100,000. For example, in early 2005, USEPA Region 2 (New York, New Jersey, the Virgin Islands, and Puerto Rico), noted that of the 480 hospitals in the region, 44 have been inspected to date, resulting in 22 enforcement actions. Nine formal enforcement actions resulted in proposed fines of more than $900,000 and six settlements were reached for a total of more than $400,000 in fines. The problem addressed by the present invention is large, and its priority to regulators is increasing and likely to continue rising in importance.

An article on the impact and risks of drugs in the water system was released by the Associated Press on Mar. 10, 2008. The story was picked up by CNN, USA Today, Fox News and many national and international news outlets. The Denver Post ran a follow up article on Sep. 11, 2008 confirming that municipalities are finding most of their systems have detectable levels of narcotics, hormones and other potentially dangerous contaminants. These articles have had the effect of energizing the public and lobbyists around the issue of water contamination. As a result, relevant agencies are now working together to identify possible solutions and agree on best practices for handling drugs prior to or once in the water system.

A variety of treatment/processing options are available to treat wastewater containing unused pharmaceuticals. These processing options include chemical or physical adsorption, ion exchange, membrane filtration, electrodeionization, photo ionization, and other similar technologies. Treatment can include destruction of target compounds by exposing them to appropriate chemicals. Destruction can be accomplished by exposing organic materials to acids, bases, oxidizers, or reducing agents. Oxidizers, for example, may include peroxide, chlorine (gaseous or in solution), and various other chemicals and may be derived in-situ from known processes.

Activated carbon, coal or resin beads remove oxidizers from a solution by a physical or chemical adsorption mechanism and remove dissolved organics by physical adsorption. Activated carbon can be used as granules or in monolithic block form.

Ion exchange works by exchanging hydrogen ions for cationic contaminants and hydroxyl ions for anionic contaminants in an aqueous solution. Ion exchange resin beds are made up of small beads through which the solution passes. After a period of time, cations and anions from the solution will replace most of the available hydrogen and hydroxyl sites in the resins and the resin bed will need to be replaced or regenerated. Ion exchange will only remove ionic compounds from the water. Dissolved organics can foul the ion exchange beads, decreasing their capacity. Where organically and inorganically pure water is needed, the combination of reverse osmosis or carbon filtration followed by ion exchange is particularly effective.

There are multiple names for filtration using microporous membranes including, but without limitation, microporous filtration, reverse osmosis (RO), ultra-filtration. All of these filtration technologies have in common the use of a membrane with tiny pores through which water may pass, but which prevents the passage of particles or solutes of a particular charge or size. Reverse osmosis is based on the fact that a chemical potential gradient can be eliminated by forcing a solution through a membrane. Water, driven by an osmotic pressure, a force caused by the concentration difference, passes through the membrane into the concentrated solution. The flow of water continues until the concentrated solution is diluted to approximately the same concentration as the formerly dilute solution (i.e., the chemical potential gradient is eliminated). If a pressure greater than the osmotic pressure is applied to the higher concentration side of the membrane, the normal direction of osmotic flow is reversed, pure water passes through the membrane from the concentrated solution and is thus separated from its contaminants. Membrane materials include, but are not limited to polyamide thin film and cellulosic membranes. Thin-film composite membranes are commonly used, but the materials of which they are comprised vary greatly. Ultra-filtration uses a membrane very similar in design to reverse osmosis, except that the ultra-filter pores are slightly larger, from 0.001 to 0.02 micron. The details of how to apply filtration using membranes will vary depending on the purity of effluent desired and the materials to be removed.

Electrodeionization ("EDI") features a combination of ion exchange resin and ion-selective membranes. EDI is a refinement of electrodialysis ("ED"). The principle of ED is that water is purified in a cell containing two types of ion selective membranes (cation-permeable and anion-permeable) between a pair of electrodes. When an electric potential is applied across the cell, the cations in the water migrate towards the negatively charged cathode and the anions migrate towards the positively charged anode. The cations can pass through the cation-permeable membrane, but not through the anionic one and vice-versa. The net result is the movement of ions between chambers and the water in one section can become deionized while that in another section becomes concentrated. There is a practical limit to the purity than can be obtained by ED because of the prohibitively high electrical voltages required to drive ions through water of increasingly high purity. This problem is overcome in EDI technology by filling the spaces between the membranes with ion exchange resins. The resins provide a conductive flow path for the migration of ions, enabling deionization to be virtually complete and resulting in the production of high-purity water.

Photo-oxidation uses high intensity electromagnetic radiation (usually ultraviolet) to cleave and ionize organic compounds for subsequent removal by, for example, ion exchange cartridges. Radiation with a wavelength of 185 nm is most effective for the oxidation of organics.

SUMMARY OF THE INVENTION

The present invention relates to disposal and/or destruction of target compounds such as drugs, injectables, and other pharmaceuticals. More particularly, the invention is an apparatus that destroys unused target compounds, then filters out the byproducts of the destruction process.

The invention may embody a target compound treatment apparatus comprising:
(a) a destruction zone in which an aqueous solution containing at least one target compound is exposed to a destruction agent adapted to convert the target compound into destruction byproduct;
(b) a filtration zone in which a filtration agent removes the destruction byproduct from the solution or suspension. The invention may also include a pretreatment zone adapted to facilitate target compounds entering solution or a flow inducer adapted to cause the aqueous solution to flow through the apparatus.

The destruction agent may comprise an acid, a base, an oxidizing agent (such as hydrogen peroxide or Fenton's reagent), or a reducing agent, and it may be available on the surface of a solid substrate disposed within the destruction zone, the substrate either a granular or porous material. Alternatively, the destruction agent may be a liquid or gaseous reagent that is admixed with the aqueous solution or suspension upon activation of the apparatus by a sensor or by a user-operated switch. In addition to chemical destruction, the destruction may be accomplished by exposing the aqueous solution to a source of ionizing electromagnetic radiation. A related method of destruction is electrochemical processing, which employs an anode and cathode passing current through a liquid media containing the target compound. The destruction may be accomplished using any one or a combination of the foregoing reagents and processes.

The filtration agent may be an adsorption media such as activated carbon. In another embodiment, the filtration agent comprises a membrane adapted to allow water to pass but to prevent passage of destruction byproduct, such as an ion exchange bed or electrodeionization. Literature and testing confirm that activated charcoal filtration alone would trap around 99% of organic waste similar to pharmaceutical compounds. Normal liquid concentration rates on active ingredients in pharmaceuticals are 100-200 ppm in their raw form. So, even without a destruction step on the front end, active waste levels in the effluent in the 1-2 ppm range could be achieved just by allowing gravity to pull the waste through.

The system may loop through a charcoal filter twice, which may achieve 100 ppb of target compounds in the effluent with charcoal filtration alone.

Due to a potentially high pressure drop through the apparatus, a flow inducer may be needed to maintain adequate flow rates through the apparatus. The flow inducer, if present, may comprise a pump at either the inlet to the apparatus adapted to push the aqueous solution therethrough or at an outlet thereof.

The destruction zone and/or the filtration zone may be contained in at least one replaceable module. In one embodiment, both zones are contained in a single replaceable module. In this single-module embodiment, the destruction zone and filtration zones preferably have use rates calibrated such that they have the same treatment capacity, whereby they are spent and need replacement at the same time. In another embodiment, the destruction zone and filtration zones are housed in separately replaceable modules.

The apparatus may include a pre-treatment chamber or filter for preventing the entry of solid materials larger than a pre-determined size into the destruction zone. Another way of dealing with solids entering the apparatus is to provide a grinding zone adapted to pulverize any solid materials prior to their entry into the destruction zone. Pretreatment may include a chamber defining a section for dissolving solid target compounds before they enter the destruction zone.

The physical configuration of the present invention may comprise an in-line, under-sink device receiving waste materials through a drain and passing the destruction byproduct or through drain plumbing. It may also be a portable embodiment or a wall- or under-counter-mountable version that it not in-line with plumbing. Alternatively, the present invention may be located in a toilet for treating target compounds in urine before it passes on, for example, to a POTW. The in-toilet configuration preferably includes a means for rejecting solid waste so that it does not enter the pretreatment or destruction zones. Another embodiment allows for at least one portable collection vessel for gathering target compounds and potentially pretreating them. The collection vessel is adapted to be emptied into or "dock" with a main treatment component containing the destruction and filtration zones. The collection vessel may have a pretreatment zone for beginning the process of dissolving solids and/or destruction of target compounds.

In this specification, there are outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. Additional benefits and advantages of the present invention will become apparent in those skilled in the art to which the present invention relates from the subsequent description of the preferred embodiment and the appended claims, taken in conjunction with the accompanying drawings. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application which is measured by the claims, nor is it intended to be limiting as to the scope of the invention in any way.

DESCRIPTION OF THE DRAWINGS

FIG. 6 is a partial cutaway view of an embodiment of the invention with a pre-treatment reservoir installed underneath a sink or basin.

FIG. 10 is a perspective view of a modular embodiment of the invention.

DETAILED DESCRIPTION

Figure 1:
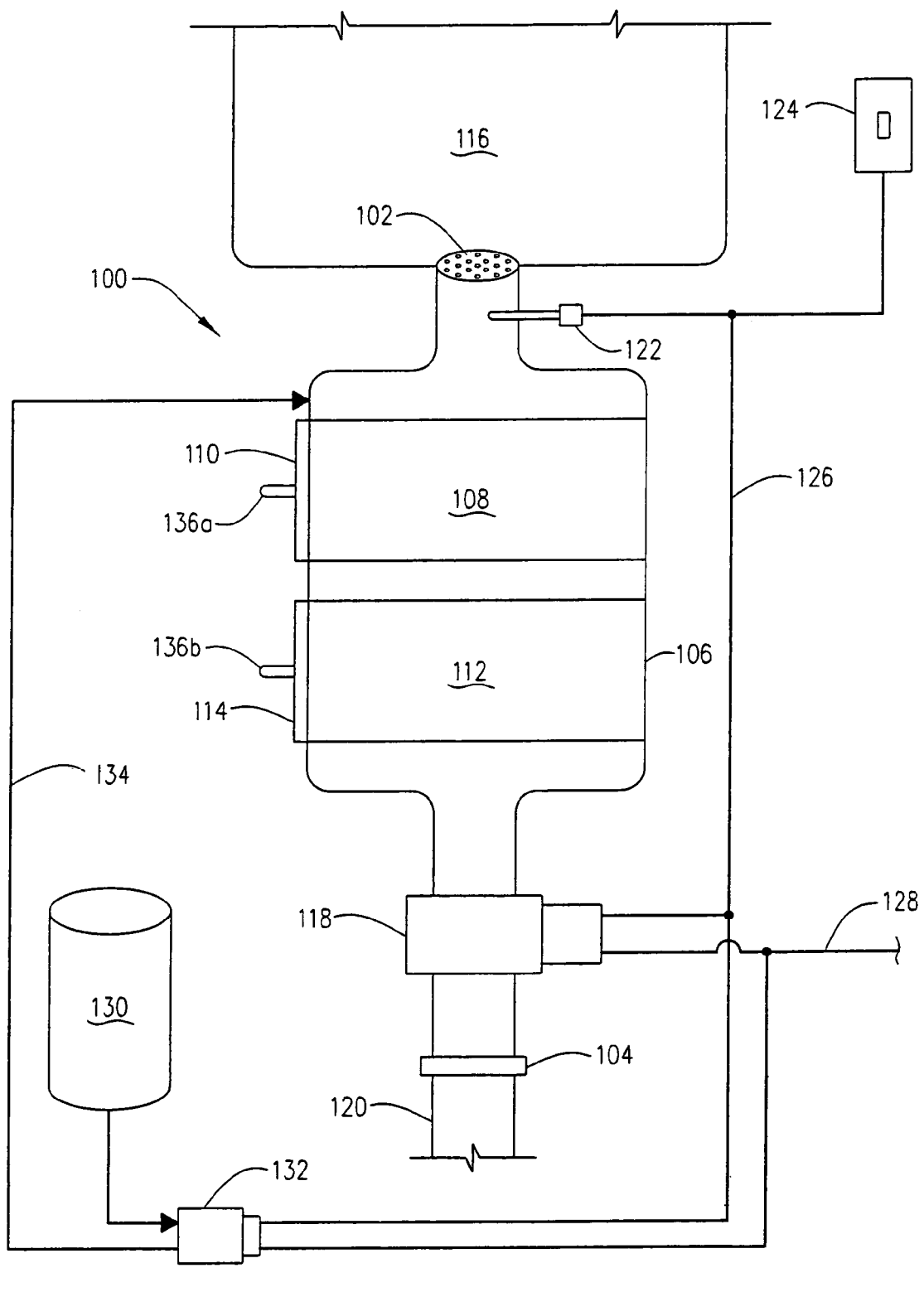
FIG. 1 is a schematic representation of a system incorporating the apparatus.

A target compound treatment apparatus 100 is shown schematically in FIG. 1. The apparatus 100 has an inlet 102, which is shown with an optional pre-filter/coarse screen. The apparatus 100 also has a body 106 terminating in an outlet 104. FIG. 1 shows the apparatus 100 having a square cross section. However, the exact cross section of the apparatus is not important: it could be round, oval, or any other cross section that is desired. Similarly, it is expected that the apparatus 100 may have a similar size to an under-sink garbage disposal. The size of the apparatus is not crucial to its novel function, but rather will be dictated by the space available and the desired life of the destruction and filtration zones. The smaller the size, the more frequently the various modules will have to be changed.

Figure 3:
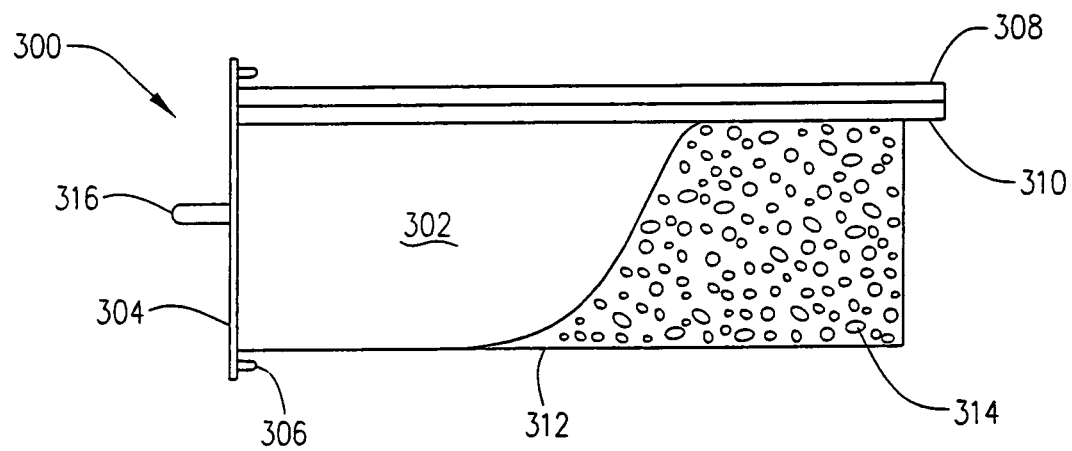
FIG. 3 is a partial cross-sectional side view of a module.

Within the body 106 are a destruction zone 108, shown as being contained within a first module 110, and a filtration zone 112, shown contained within a second module 114. Embodiments of the modules are further illustrated in FIGS. 3 and 4. FIG. 3 shows a single-zone module 300. The module 300 comprises a drawer with three watertight sides 302. The drawer shape is completed by a faceplate 304 having thereon a faceplate seal 306 for sealingly engaging the body 106. Along an upper edge of the sides is a flange 308 with a flange seal 310 on an underside thereof. The flange 308 engages the body 106 to ensure that solution flowing down through the apparatus 100 passes through the destruction 108 and filtration zones 112 rather than bypassing them. Partial cross section shows the zone content material 314 for that module, which can either be the destruction zone materials or filtration zone materials, as discussed below. After passing though the materials 314, the solution passes out through a porous bottom 312. To assist with removal of the module 300, a handle 316 is shown affixed to the faceplate 304. Module handles 136 can also be seen in FIG. 1, which shows two separate modules, but which could also be equipped with a single module as illustrated in FIG. 4.

The module 300 may also have a means for securing the destruction zone 108 and/or the filtration zone 112 in place. The means for securing may include a lock with a key release or the like. The means for securing prevents any tampering with the modules by individuals who might desire to have access to unused pharmaceuticals or other chemicals contained therein.

Figure 4:
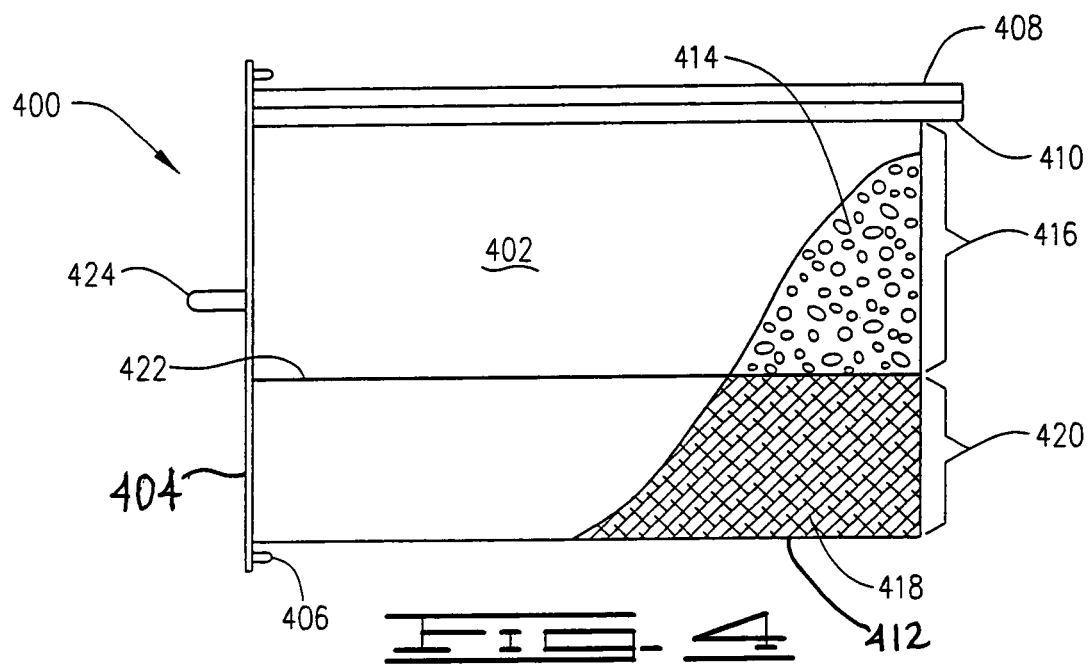
FIG. 4 is a partial cross-sectional side view of a module having both a destruction and filtration zone.

FIG. 4 shows an alternative embodiment where both the destruction agent 414 and the filtration agent 418 are contained within a combined module 400. It again has a drawer 402 with three watertight sides cooperating with a faceplate 404 to form a drawer. Affixed to the faceplate 404 is a faceplate seal 406 for sealingly engaging the faceplate 404 to the body 106. A flange 408 is affixed to an upper edge of the drawer, the flange having a flange seal 410 on a lower surface for sealingly engaging a cooperating ridge within the body 106. The bottom of the drawer 402 has a porous bottom 412 to support the filtration agent 418. Disposed on top of the filtration agent 418 is the destruction agent 414. There may be a porous divider 422 (such as a screen or grate) disposed between the destruction agent 414 and the filtration agent 418, or they may simply rest upon one another. Depending on the target compound to be treated and the chemicals used to treat them, the destruction zone depth 416 or the filtration zone depth 420 will be varied with the object being depletion of both the destruction agent and the filtration agent at the same time. That is, the object will be to vary the depth of the materials to ensure that the times when both zones are used up is as close to the same as possible. Again, a handle 424 is shown affixed to the faceplate 404 to facilitate removal of the combined module 400.

The apparatus 100 may be mounted below a sink or basin 116 or near a sink or basin or a portable configuration. To ensure an adequate flow rate of solution through the apparatus 100, there may be a flow inducer or pump 118. The pump 118 can be activated automatically by way of a sensor 122 or manually with a switch 124 in communication with the pump 118 by way of a control circuit 126. If a manual switch 124 is used, it can be either a wall switch such as is typically used for lights and the like, or it may be a foot pedal located adjacent to the apparatus 100. An "always on" option may be available for high-generation environments. The pump 118 may be battery-powered, but will preferably be powered by an external power source 128. In some embodiments it may be desirable to have both a switch and a sensor, as shown. Following the outlet 104, the apparatus is attached to a wastewater line 120 to accept solution flowing out of the apparatus 100.

Where, for example, the destruction agent is a liquid or gas, a chemical tank 130 may be needed to provide a storage reservoir. A pump or compressor 132 may be needed to move the chemical into the destruction zone 108 through a chemical supply line 134. Preferably, as shown, the chemical pump will also preferably be powered by and controlled by the same control circuit 126 and power source 128 as the pump 118.

No tank 130 is needed if the destructive agent is a solid substrate as shown in FIG. 3 or 4. The solid substrate may be a bed of granular solids either comprised entirely of the destructive agent or with the agent deposited at least on the surface of the granules. Alternatively, the solid substrate may be a porous matrix containing the destructive agent. If it is a porous matrix, the substrate may either be spongy, with the destructive agent therein, or a porous solid matrix either comprised of the destructive agent or having it at least on a surface thereof.

Figure 2:
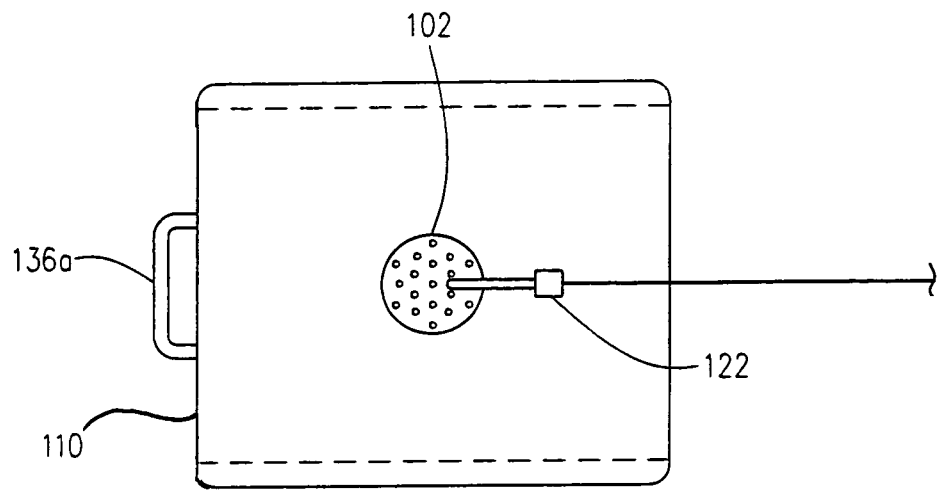
FIG. 2 is a top view of the apparatus.

FIG. 2 is a top view of the apparatus. The inlet 102 is shown with a pre-filter to prevent coarse solids from entering. A module handle 136a can be seen. Also, a sensor 122 is shown at the inlet 102 for detection of solution entering the apparatus 100. A signal generated by the sensor 122 may activate the pump 118.

Figure 5:
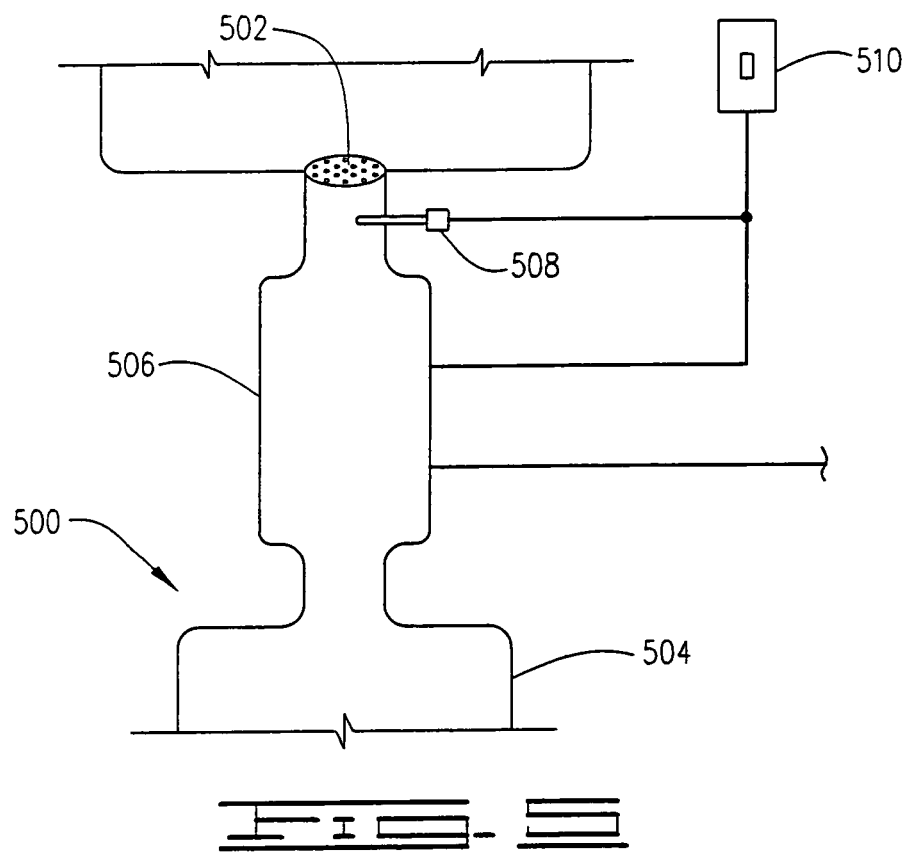
FIG. 5 is a partial schematic representation of an apparatus incorporating a grinder for pulverizing larger solids placed into the apparatus.
Figure 5:
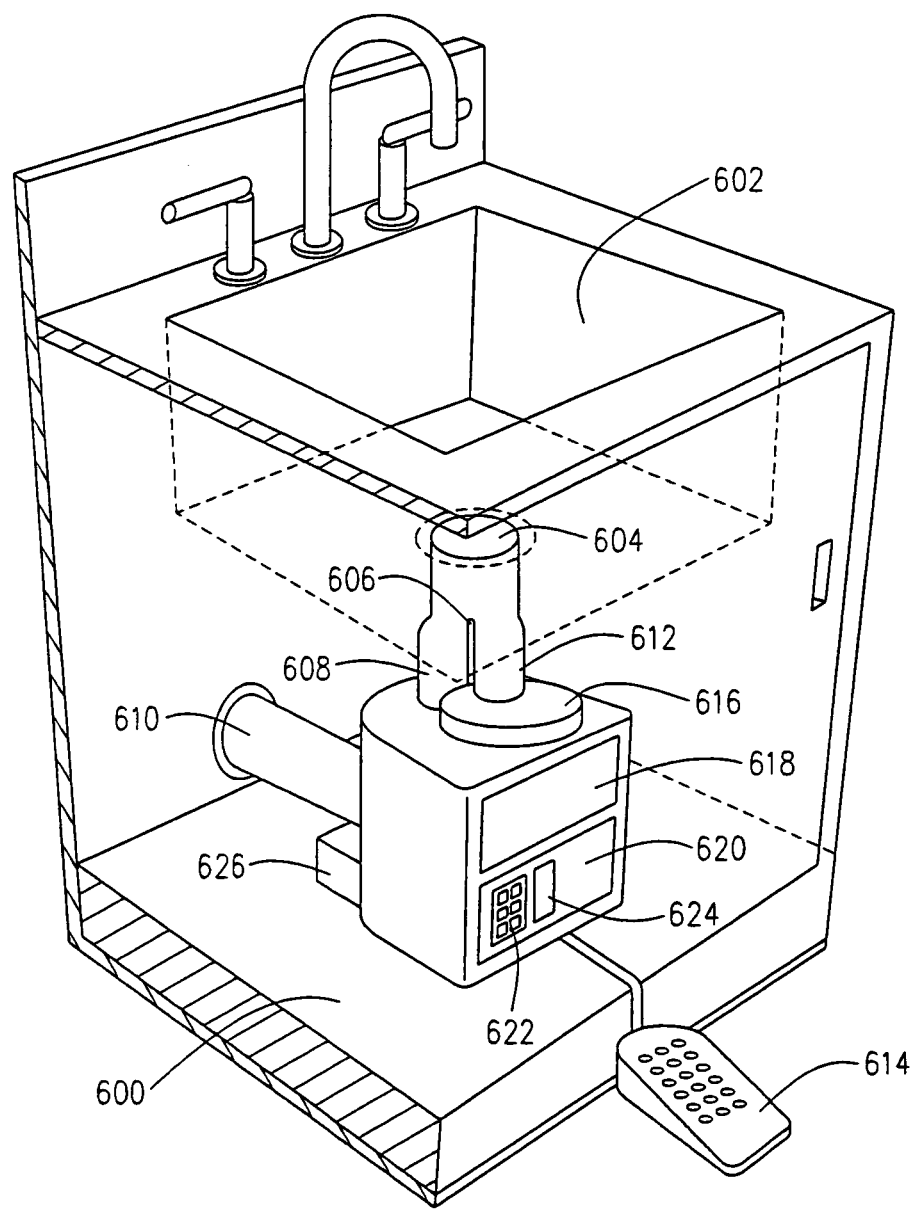

FIG. 5 shows an embodiment of the apparatus 500 incorporating a grinder 506. The grinder 506 is disposed between the inlet 502 and the body 504. The grinder 506 may be integrated onto the body 504. Preferably the grinder 506 is activated by the same sensor 508 or switch 510 that activates the pump 118. Alternatively, the grinder may have a separate switch for its activation. The grinder may also be provided as a macerator pump or the like.

FIG. 6 shows an embodiment of an apparatus 600 mounted underneath a sink 602. The sink drain 604 leads to a split in the piping 606 at which point materials are either directed into a pass-through drain 608, which bypasses the apparatus and passes directly to the outlet 610, typically then on to a publicly owned treatment works, but alternatively to an on-site water treatment system or even a holding tank, or into the filter drain 612, then on into treatment/filtration portions apparatus 600. Selection of whether entering materials are directed into the pass-through drain 608, i.e., bypassing the treatment function, or the filter drain 612 is made by means of a switch mechanism which, as shown, is an activation foot pedal 614 in communication with the switch mechanism. Materials entering the sink drain 604 are directed into the pass-through drain 608 unless an operator activates the switch mechanism, thereby directing the entering materials into the filter drain 612.

A pre-treatment reservoir 616 is located between the filter drain 612 and the destruction zone 618. The pre-treatment reservoir can serve several purposes. First, the pre-treatment reservoir 616 may serve as a holding area where solids entering the apparatus 600 can be retained for some time while dissolving by exposure to solutions passing therethrough or by addition of a dissolving reagent. In this embodiment, the reservoir preferably has a screen or other filtration-type apparatus at its outlet that prevents undissolved solid materials from continuing on into the destruction zone 618. In the alternative embodiment, the pre-treatment reservoir 616 can serve as a storage or holding tank until a desired volume of material to be treated has been aggregated therein. At that time, the contents of the reservoir are released into the destruction zone 618 in a batch fashion.

After passing through the pre-treatment reservoir 616, materials pass into the destruction zone 618, then on into a filtration zone 620. After treatment and filtration, remaining materials pass into the outlet drain 610.

As shown, a keypad 622 is provided for entry of data into a control system. A display screen 624 may also be included in communication with a control system for providing feedback to a user regarding either data entry or system operation. For example, if the pre-treatment reservoir 616 operates in batch fashion, the screen 624 may be used to indicate the number of cycles, and to indicate how many are left before it is necessary to perform maintenance on the destruction and/or filtration zones.

A pump 626 may be desirable to ensure adequate flow through the apparatus 600. The pump may be automatically activated with the switch mechanism such as the foot pedal 614 shown in FIG. 6. In the embodiment where the pretreatment reservoir 616 dumps in a batch fashion, the pump 626 may be automatically activated in association with a dump cycle. Alternatively, the pump may be manually activated by a user when they observe an inadequate flow through the apparatus 600.

Figure 7:
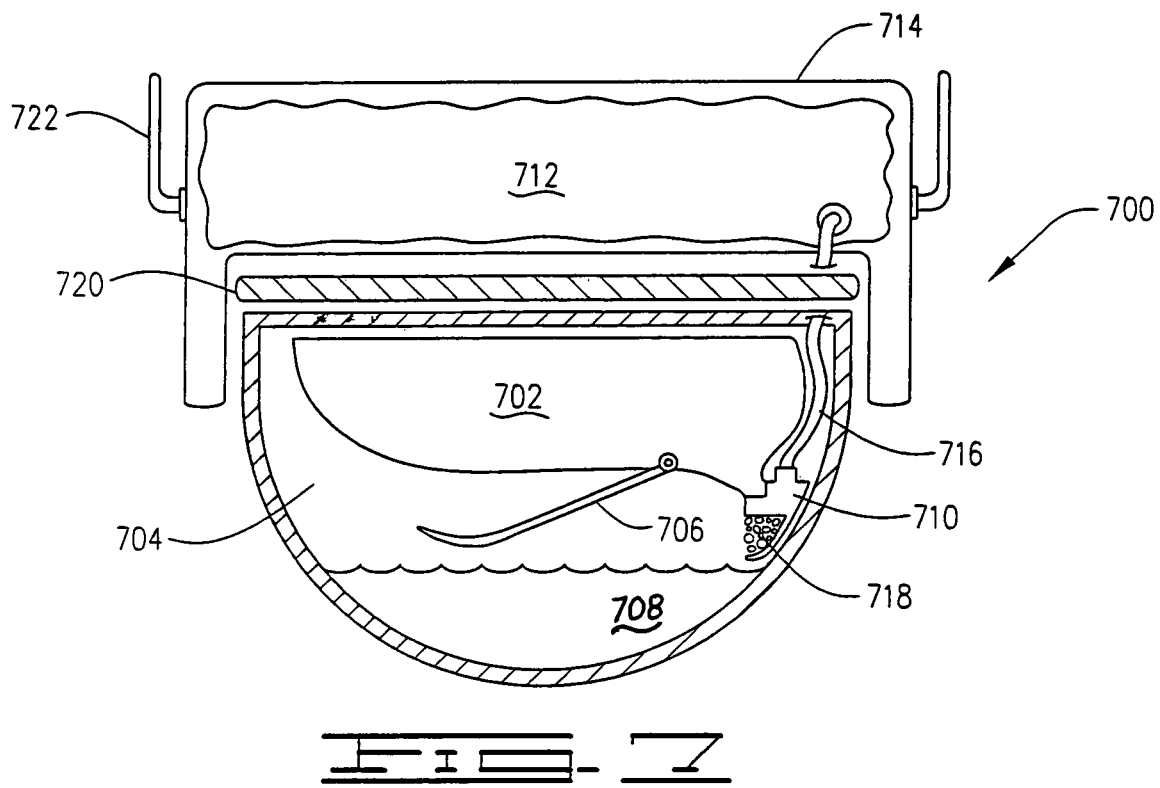
FIG. 7 is a front sectional view of an in-toilet embodiment.

FIG. 7 shows an in-toilet embodiment 700 in a front cross-sectional view. The in-toilet embodiment 700 preferably has a collapsible funnel 702 disposed within a bowl 704 of a toilet. The funnel 702 includes a trap door 706 to allow solid waste to pass into toilet water 708 without being processed in a compact destruction zone 710 into which the funnel 702 channels urine entering it. The urine encounters a destruction agent preferably fed into the destruction zone 710 from a reservoir 712. As shown, the reservoir 712 is defined within a toilet seat riser 714. However, the reservoir 712 could be in any nearby location where gravity feed (preferred) or a pump could allow it to flow into the destruction zone 710. A tube 716 caries the destruction agent from the reservoir 712 to the destruction zone 710. Destruction agent from the reservoir 712 may be activated to enter the destruction zone 710 by the flushing of the toilet in which the apparatus is mounted. The activation may be a mechanical link with the toilet handle or an electronic or hydraulic mechanism activated by the flow of water or the physical action of the toilet handle. A filtration zone 718 follows the destruction zone 710. After passing through the destruction zone 710 and the filtration zone 718, the processed urine flows into toilet water 708 for disposal. If a riser 714 is used, it is disposed over a toilet lid 720. A lever 722 activates the collapsible action of the funnel 702.

The invention necessarily includes a disposal means for the an aqueous solution and for the destruction byproducts trapped in the filter. The disposal means may comprise the aqueous solution or suspension passing through a drain to a POTW or other water processing facility. Alternatively, the disposal means may comprise collection of the wastewater for transportation to an off site disposal facility. Solids may be filtered out and collected for offsite disposal. For example, the materials trapped in the filter may be transported off site for destruction by combustion, electrochemical process. Disposal may include recovery and reuse of the destruction byproducts. It is intended that the disposal means could comprise any of the various processing options discussed in this specification.

Figure 8:
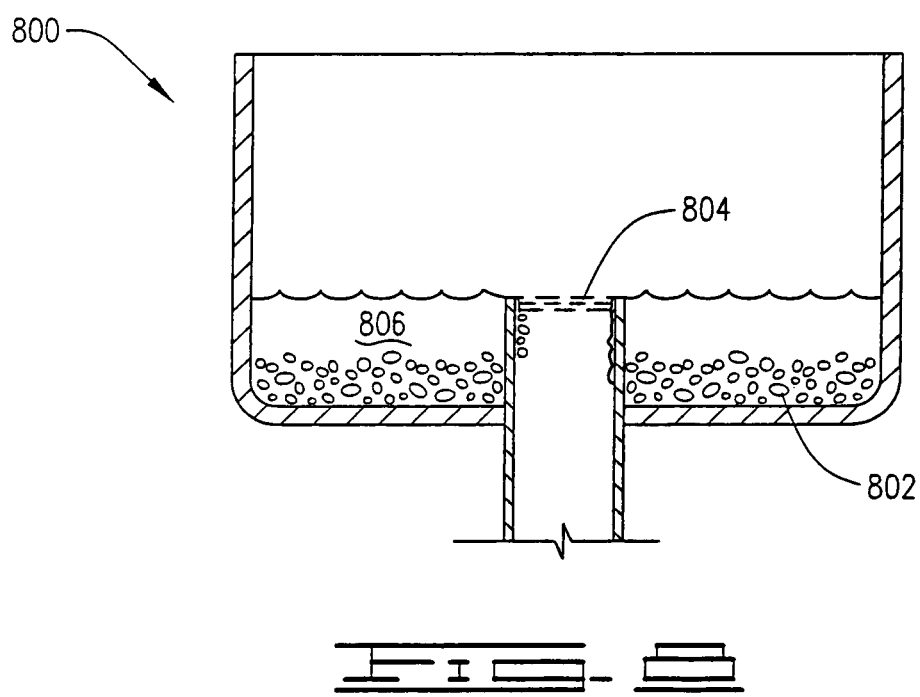
FIG. 8 is a side sectional view of a pre-treatment chamber having a section for dissolving solids.

FIG. 8 is a cross-sectional side view of a pretreatment chamber 800 defining therein a space for collection of target compounds 802. An elevated intake orifice 804 maintains a pool of solution 806 in the chamber, facilitating solid target compounds 802 entering a solution before entering a destruction zone.

Figure 9:
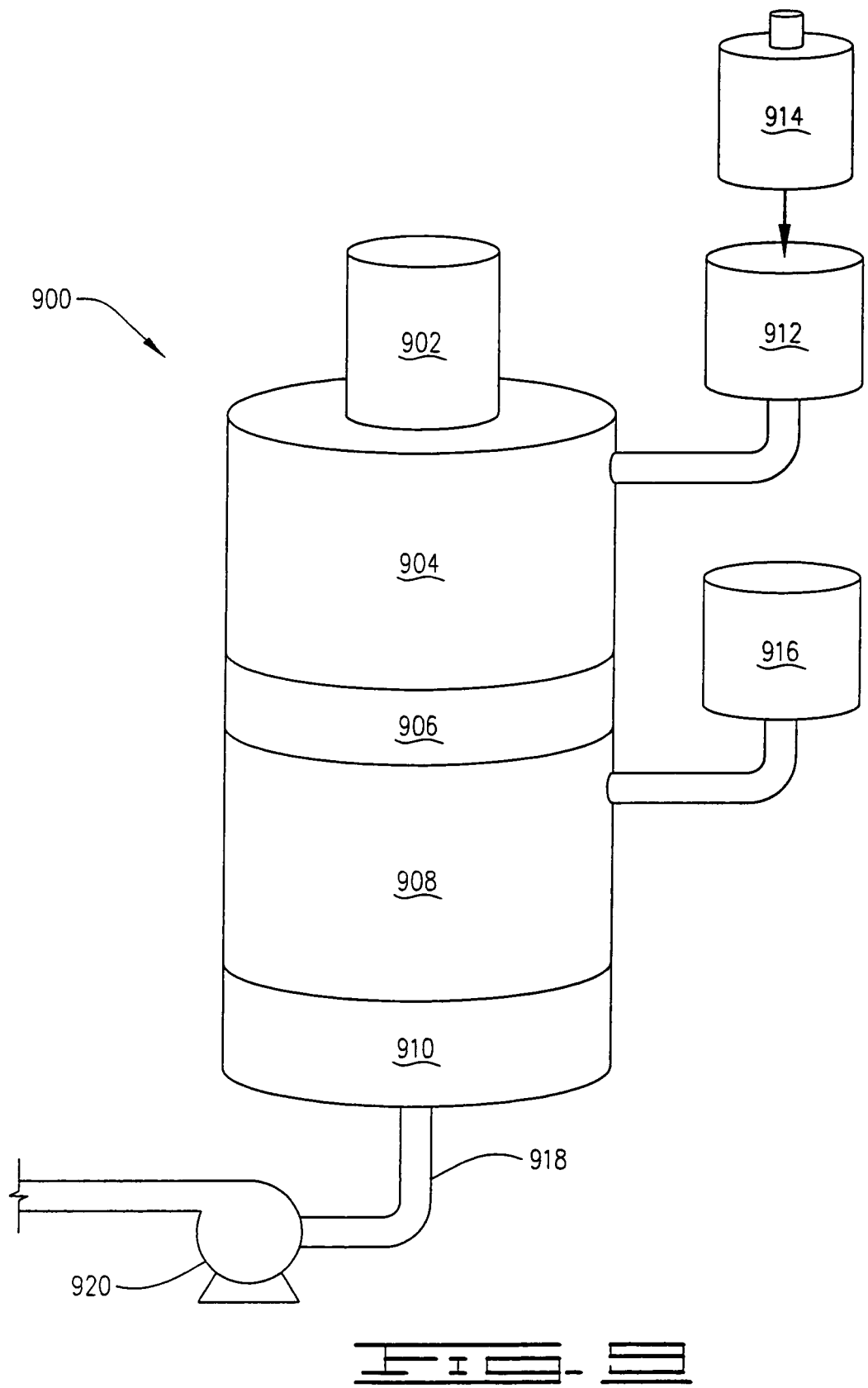
FIG. 9 is a perspective view of an embodiment adapted to either allow direct introduction of a target compound or to interface with a removable collection vessel.

FIG. 9 is a perspective view of an embodiment 900 adapted to either allow direct introduction of a target compound or to interface with a removable collection vessel 914. The apparatus 900 has an initial aperture 902 through which target compounds can be introduced. From there, target compounds introduced into the aperture may pass through a torture path to limit the ability to retrieve target compounds placed therein. Part of the objective of the invention is also to prevent misuse of controlled substances. A torture path advances this objective by preventing later retrieval of controlled substances introduced to the apparatus 900. After the aperture 902 and the optional torture path, target compounds may pass into a receiving zone 904 that serves both to hold target compounds and to facilitate dissolving any solids. A first docking station 912 may be in communication with the receiving zone 904 and adapted to releasably communicate with a collection unit 914. Multiple collection units may be distributed throughout a facility in which this embodiment 900 is located, and target compounds collected into each of the collection units 914 for later being passed into a docking station adapted to convey target compounds from the collection unit 914 into the embodiment 900 at some point in the unit, either a first docking station discussed above, or a second docking station 916 discussed below. A macerator 906 may be located between the receiving zone 904 and the destruction zone 908. The macerator 906 may serve to pulverize any remaining solids and to pump solution through the device. In another embodiment, any solids entering the apparatus would be dissolved in a chemical solution. The destruction zone 908 contains a destruction agent or such an agent is introduced therein to act on target compounds. A second docking station 916 is in communication with the destruction zone 908 for allowing introduction of target compounds by way of releasable communication with a collection unit 914. Such a configuration is desirable particularly where the collection unit 914 includes an elevated orifice of the type shown in FIG. 8 or a similar chamber for facilitating the dissolving of solid target compounds collected therein. After the destruction zone, the solution passes into a filtration zone 910. Once filtered, the solution passes out an outlet 918, and flow, if not viable by way of gravity, may be facilitated by a pump 920.

FIG. 10 is a perspective view of a modular embodiment 1002 of the invention on a wheeled cart 1004. The embodiment preferably has an outer case 1006 within which the mechanism similar to that shown in FIG. 1 is contained. There is an inlet port or basin 1008 for receiving the material to be processed. There is an inlet port 1010 for water and preferably an outlet port 1012. Contained within the case 1006 may be a holding tank for situations in which it is not practical to dump the effluent from the device. Similarly, there may be a supply tank for providing water when connection to a water source is not practical. The front face 1014 of the apparatus may have a destruction zone module 1016 and a filtration zone module 1018 accessible therethrough for checking and/or replacing those modules as needed. Specialized status lights may be provided for the filtration zone 1022 and for the destruction zone 1020, to indicate the status of the zones. For example, the lights may be green when the zones are operating properly and red when they need to be maintained. A power cord 1024 allows for ease of connection to a source of electricity instead of requiring a hard-wired connection. A power switch 1026 may be disposed on the case 1006. A display screen 1028 is preferably provided to display information related to the operation of the apparatus, and information preferably can be input via a key pad 1030. The cart 1004 may define storage therein, either shelves or a cabinet with doors 1032 as shown. The modular embodiment may be permanently mounted to a wall or otherwise in a desired location. Alternately, it may be disposed on a counter-top.

While the invention has been shown, illustrated, described and disclosed in terms of specific embodiments or modifications, the scope of the invention should not be deemed to be limited by the precise embodiment or modification therein shown, illustrated, described or disclosed. Such other embodiments or modifications are intended to be reserved especially as they fall within the scope of the claims herein appended.

Thus having described the invention, We claim:

1. A disposal apparatus adapted to treat at least one target compound, the disposal apparatus comprising:
 a housing having an inlet at a first end of the housing and an outlet at a second end of the housing, the inlet and the outlet defining a direction of fluid flow;
 a receiving zone defined within the housing, the receiving zone comprising an inlet configured to receive a waste fluid containing at least one target compound;
 disposed downstream of the receiving zone in the direction of fluid flow and within the housing, a pre-treatment reservoir configured to receive the waste fluid and hold the waste fluid for a predetermined period of time;
 disposed downstream of the pre-treatment reservoir in the direction of fluid flow and within the housing, a destruction zone configured to receive the waste fluid that is released from the pre-treatment reservoir after the predetermined period of time, and expose the waste fluid to a destruction agent, the destruction agent comprising Fenton's reagent;
 disposed downstream of the destruction zone in the direction of fluid flow and within the housing, a filtration zone containing a filtration agent adapted to remove a portion of the destruction byproducts from the fluid; and
 a liquid disposal configured to receive a filter fluid from the filtration zone;
 wherein the disposal apparatus is configured to prevent the target compound from entering a water system;
 wherein the destruction zone and the filtration zone are contained in a single replaceable module within the housing, the single replaceable module including a shared porous divider provided between the destruction zone and the filtration zone; and
 wherein the fluid exiting the destruction zone directly enters the filtration zone by flowing through the shared porous divider.

2. The disposal apparatus of claim 1, wherein the destruction agent comprises Fenton's reagent.

3. The disposal apparatus of claim 1, wherein the filtration agent comprises activated charcoal.

4. The disposal apparatus of claim 1, wherein the liquid disposal comprises a holding tank.

5. The disposal apparatus of claim 1, wherein the housing comprises a water connection and a drain connection.

6. The disposal apparatus of claim 1, wherein the waste fluid contains liquid and solid materials, and the pre-treatment reservoir contains a solution configured to admix with the liquid and solid materials to dissolve the solid materials.

7. The disposal apparatus of claim 1, wherein the receiving zone is a collapsible funnel adapted to be received within a toilet bowl.

8. The disposal apparatus of claim 7, wherein the funnel is configured to be deactivated by a handle to move it out of a path of solid waste entering the toilet bowl.

9. The disposal apparatus of claim 8, wherein the funnel further defines a trap door configured to prevent the solid waste from entering the destruction zone.

10. The disposal apparatus of claim 7, further comprising a reservoir in communication with the destruction zone, the reservoir containing the destruction agent that enters the destruction zone as needed.

11. The disposal apparatus of claim 10, wherein a release of the destruction agent is triggered by flushing a toilet in which the disposal apparatus is mounted.

12. The disposal apparatus of claim 1, further comprising at least one docking station configured to releasably communicate with at least one collection unit, wherein target compounds are configured to be collected in a collection unit, then brought to the disposal apparatus and introduced thereinto by releasable communication between the docking station and the collection unit.

13. The disposal apparatus of claim 12, further comprising a torture path following an aperture for introduction of the target compounds, wherein after introduction of the target compounds into the aperture, the target compounds cannot be retrieved from the disposal apparatus.

14. The disposal apparatus of claim 1, wherein the receiving zone comprises a connection configured to fluidly connect to a sink drain, and wherein the connection comprises a split pipe having a first pipe configured to deliver the waste fluid from the sink drain to the receiving zone and a second pipe configured to allow the waste fluid to bypass the disposal apparatus.

15. The disposal apparatus of claim 1, wherein the pre-treatment reservoir is configured to hold the waste fluid until a predetermined volume of waste fluid to be treated is reached, and then release the waste fluid into the destruction zone in a batch fashion.

16. A disposal apparatus adapted to treat at least one target compound, the disposal apparatus comprising:
 a housing;
 a receiving zone defined within the housing, the receiving zone comprising an inlet configured to receive a waste fluid containing at least one target compound;
 disposed after the receiving zone within the housing, a pre-treatment reservoir configured to receive the waste fluid and hold the waste fluid for a predetermined period of time;
 disposed after the pre-treatment reservoir within the housing, a destruction zone configured to receive the waste fluid that is released from the pre-treatment reservoir after the predetermined period of time, and expose the waste fluid to a destruction agent, the destruction agent comprising Fenton's reagent;
 disposed after the destruction zone, a filtration zone containing a filtration agent adapted to remove a portion of the destruction byproducts from the fluid;
 a liquid disposal configured to receive a filtered fluid from the filtration zone; and
 a display screen in communication with a control system, the display screen configured to provide feedback regarding data entry or system operation;
 wherein the disposal apparatus is configured to prevent the target compound from entering a wastewater system;
 wherein the destruction zone and the filtration zone are contained in a single replaceable module within the housing, the single replaceable module including a shared porous divider provided between the destruction zone and the filtration zone; and
 wherein the fluid exiting the destruction zone directly enters the filtration zone by flowing through the shared porous divider.

17. The disposal apparatus of claim 16, wherein the display screen is configured to provide feedback regarding data entry related to destruction of controlled substances present in the waste fluid, where the controlled substances are identified by the Drug Enforcement Agency.

* * * * *

UNITED STATES PATENT AND TRADEMARK OFFICE
CERTIFICATE OF CORRECTION

PATENT NO. : 9,126,854 B2
APPLICATION NO. : 12/807551
DATED : September 8, 2015
INVENTOR(S) : McGee et al.

It is certified that error appears in the above-identified patent and that said Letters Patent is hereby corrected as shown below:

In Claim 1, Column 11, Line 28, please delete "a water system" and replace it with --a wastewater system--.

In Claim 2, Column 11, Lines 37-38, please cancel claim 2 in its entirety.

In Claim 3, Column 11, Line 39, renumber Claim 3 as Claim 2.

In Claim 4, Column 11, Line 41, renumber Claim 4 as Claim 3.

In Claim 5, Column 11, Line 43, renumber Claim 5 as Claim 4.

In Claim 6, Column 11, Line 45, renumber Claim 6 as Claim 5.

In Claim 7, Column 11, Line 49, renumber Claim 7 as Claim 6.

In Claim 8, Column 11, Line 52, renumber Claim 8 as Claim 7.

In Claim 8, Column 11, Line 52, delete "claim 7" and replace it with --claim 6--.

In Claim 9, Column 11, Line 55, renumber Claim 9 as Claim 8.

In Claim 9, Column 11, Line 55, delete "claim 8" and replace it with --claim 7--.

In Claim 10, Column 11, Line 58, renumber Claim 10 as Claim 9.

In Claim 10, Column 11, Line 58, delete "claim 7" and replace it with --claim 6--.

In Claim 11, Column 11, Line 62, renumber Claim 11 as Claim 10.

Signed and Sealed this
Fifth Day of July, 2016

Michelle K. Lee
*Director of the United States Patent and Trademark Office*

CERTIFICATE OF CORRECTION (continued)
U.S. Pat. No. 9,126,854 B2

In Claim 11, Column 11, Line 62, delete "claim 10" and replace it with --claim 9--.

In Claim 12, Column 12, Line 1, renumber Claim 12 as Claim 11.

In Claim 13, Column 12, Line 8, renumber Claim 13 as Claim 12.

In Claim 13, Column 12, Line 8, delete "claim 12" and replace it with --claim 11--.

In Claim 14, Column 12, Line 13, renumber Claim 14 as Claim 13.

In Claim 15, Column 12, Line 20, renumber Claim 15 as Claim 14.

In Claim 16, Column 12, Line 25, renumber Claim 16 as Claim 15.

In Claim 17, Column 12, Line 59, renumber Claim 17 as Claim 16.

In Claim 17, Column 12, Line 59, delete "claim 16" and replace it with --claim 15--.